United States Patent [19]

Meyers et al.

[11] Patent Number: 6,142,103
[45] Date of Patent: Nov. 7, 2000

[54] ANIMAL TETHERING SYSTEM

[76] Inventors: William J. Meyers, 355 Bridle Path Ter.; Jerome R. Young, 25 El Caballo Trail, both of Sparks, Nev. 89436

[21] Appl. No.: 09/208,373

[22] Filed: Dec. 9, 1998

[51] Int. Cl.[7] ................................ A01K 1/04; A47F 5/08
[52] U.S. Cl. ...................................... 119/771; 248/289.11
[58] Field of Search ........................... 119/769, 771, 119/774, 783, 799, 780; 278/28; 248/251, 289.11, 299.1; 472/16, 29

[56] References Cited

U.S. PATENT DOCUMENTS

| | | | |
|---|---|---|---|
| 1,228,583 | 6/1917 | Mueller | 248/289.11 |
| 2,902,976 | 9/1959 | Wilson | 119/769 |
| 2,981,230 | 4/1961 | Putnam | 119/780 |
| 3,454,275 | 7/1969 | Pontone | 248/289.11 |
| 3,825,127 | 7/1974 | Morrison et al. | 248/289.11 |
| 4,134,364 | 1/1979 | Boncela | 119/771 |
| 4,509,462 | 4/1985 | Pickett | 119/780 |
| 5,136,813 | 8/1992 | Gibbs et al. | 49/404 |
| 5,225,843 | 7/1993 | Lupo | 248/289.11 |
| 5,775,264 | 7/1998 | Dixon et al. | 119/771 |

*Primary Examiner*—Peter M. Poon
*Assistant Examiner*—Elizabeth Shaw
*Attorney, Agent, or Firm*—Skinner, Sutton, Watson & Rounds; Charles Hartman; Adrienne Yeung

[57] ABSTRACT

An animal tethering system to secure the tether of animal comprising of a frame which has a vertical arm and an extended horizontal arm. The horizontal arm is positioned by the attachment of two cables on either side holding it extended at a right angle from a vertical surface such as a wall or horse trailer. The animal tethering system is specifically designed to be mounted above the animals head. All structural supports to the animal tethering system have been incorporated into the design of the animal tethering system so as to provide a minimal opportunity for a horse or bovine to entangle its self in the tethering device.

7 Claims, 4 Drawing Sheets

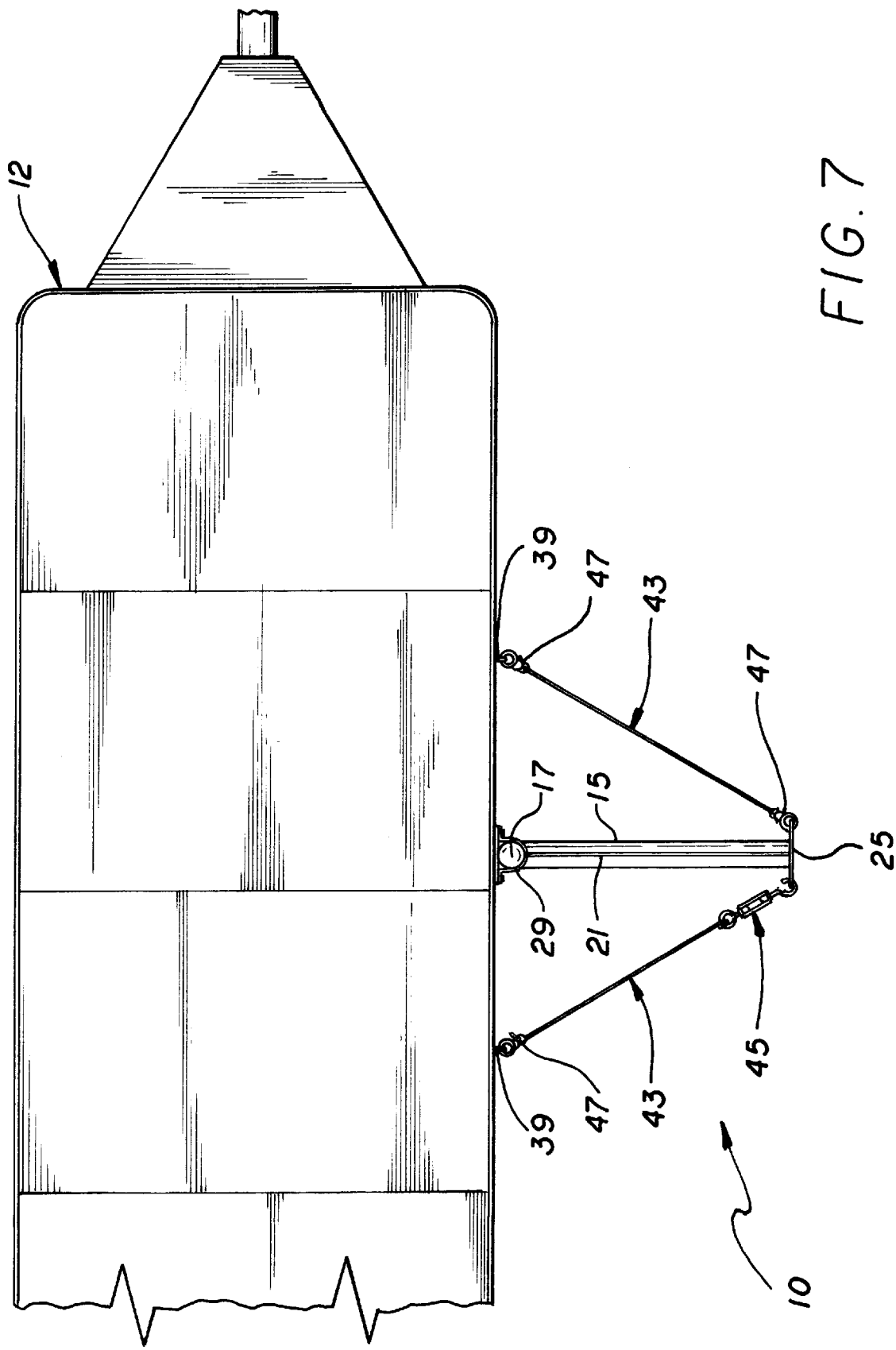

ANIMAL TETHERING SYSTEM

BACKGROUND OF THE INVENTION

I. Field of the Invention

This invention relates to the field of tethering devices for animals, specifically to a device that is safe and of sufficient strength to hold a large equine or bovine animal.

II. Description of Prior Art

Tying a halter lead animal such as an equine or bovine to a rail or ring mounted to a solid or mobile object is common practice. However, an animal, especially a horse, tied in such a manner is more susceptible to injury or causing damage to the supporting structure. Therefore, there is a need to locate the tethering device in a position that provides the least opportunity to cause injury while in use and stores out of the way when not in use.

A search has disclosed devices that attempt to address the problem. Among these are U.S. Pat. No. 5,775,264 issued to Randall W. Dixon; Joseph L. Dixon; Emmett L. Griffeth et el. This tethering device is dangerous because it has an upper and lower support bracket that an animal could easily entangle a leg or neck. The horizontal arm of this device is at such a height that the animal could easily impale itself or push its handler into.

Another device U.S. Pat. No. D269,556 issued to Studley; James, Johnson; Bennie J. et. el, also has a lower support bracket that the animal could entangle itself. This device has no lateral support which would hold the tether arm stationary. Therefore, it would not be functional mounted on a vertical surface such as a barn or horse trailer. Without lateral supports to keep this device stationary an equine, such as a horse, would swing the device from side to side driving the device into the side of the vertical wall. The noise and damage to the wall would startle the animal causing it to struggle to get away from the tether.

The tethering device U.S. Pat. No. 4,747,372 issued to Terry, Michael D., Sequin, WA 98382—Terry, Jack M., Sequim WA 98382 is a tether for controlling the range of movement for small animals such as dogs and would not be used for an equine or bovine.

OBJECTS AND ADVANTAGES

Accordingly, several objects and advantages of my invention are:

a. to provide an animal tether safe and strong enough to secure an equine or bovine;

b. to provide an animal tether that is designed to be mounted to a vertical surface above the animal's head, since it is known in the horse community that a horse has more strength pulling up rather than down;

c. to provide an animal tether that is mounted to a vertical surface high enough to be out of danger to the animal handler;

d. to provide an animal tether with all supports in such as position as to be extremely difficult for the animal to entangle its legs or head;

e. to provide and animal tether that permanently mounts to a horse trailer which can conveniently and easily pivot to a stowed position for transport;

f. to provide an animal tether that mounts permanently to a horse trailer thus eliminating setting up a portable corral when traveling;

g. to provide an animal tether with added structural value and a smooth simple point of pivot by inserting an upper vertical tube into a lower vertical tube.

Further object and advantages are to provide an animal tether that allows the freedom of movement that will enable the animal to feed naturally and that allows the animal under certain circumstances to rest on the ground while tethered. Still further objects and advantages will become apparent from a consideration of the ensuing description and drawings.

SUMMARY OF THE INVENTION

When traveling with horses, the ability to safely tether the horses becomes an important issue. Many locations do not have facilities available to safely secure a horse for a given time. The equine tethering system provides a safe, secure environment for a horse. The device mounts high enough off the ground to prevent a horse from getting its legs or body entangled while secured to it; and it is out of harms way when being stored.

The device eliminates the need for portable corral panels or other ground-mounted devices, which can be difficult to move and set up. The equine tethering system is easily mounted to a horse trailer or a vertical wall. Once installed, the tether can be moved from the storage position to the operating position in matter of minutes. The tether does not have to be removed when in transit. As shown in the figures, the tether pivots from the front eyebolt 39. The cable attachment hole 49 aligns with the eye bolt 39 and the arm is secured by a trigger snap similar to 47.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing the preferred embodiment of the invention.

BRIEF DESCRIPTION OF THE DRAWING

The invention will be better understood and the above objects as well as objects other than those set forth above will become apparent when consideration is given to the following detailed description thereof. Such description makes reference to the annexed drawings wherein:

FIG. 7 is a top view of the embodiment as it would be mounted to a horse trailer or vertical surface in the operational position.

REFERENCE NUMERALS IN DRAWINGS

Figure 1:
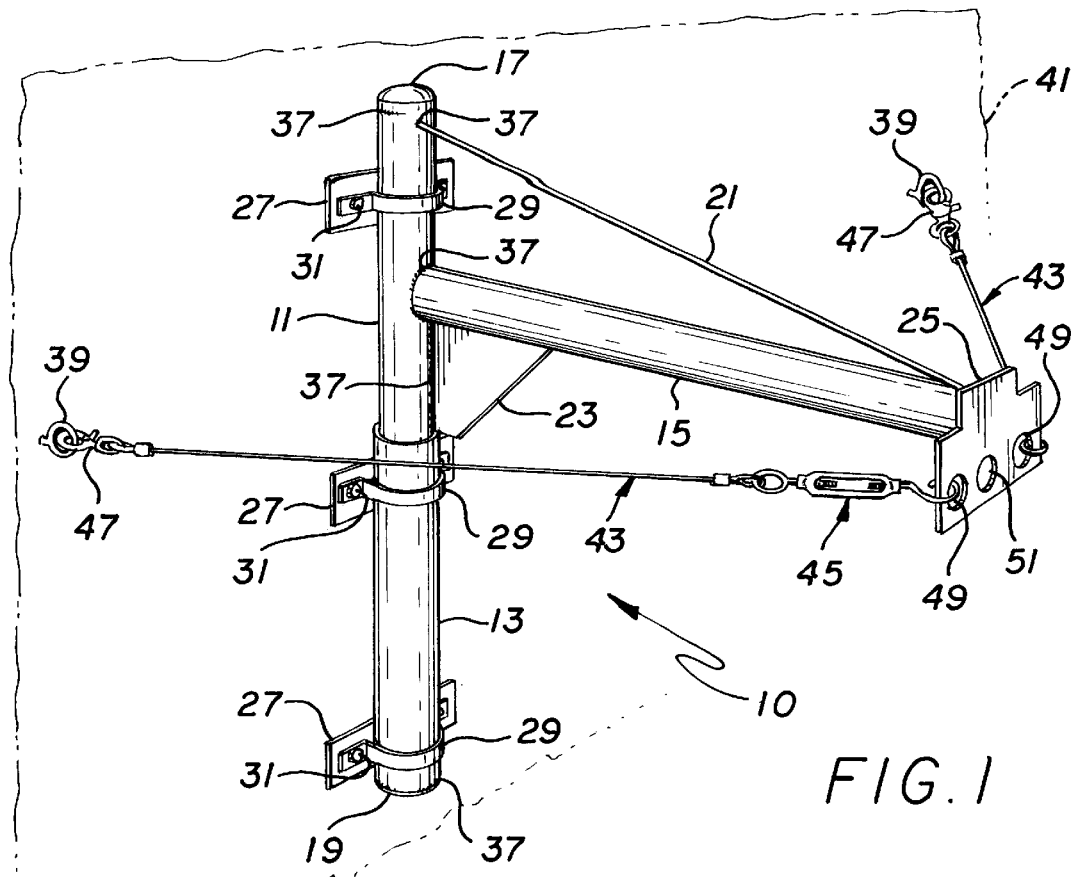
FIG. 1 is an isometric view of an embodiment of an animal tethering system made in accordance with the present invention.

| | |
|---|---|
| 10 | Horse hitch assembly |
| 11 | Upper vertical tube |
| 12 | Horse trailer |
| 13 | Lower vertical tube |
| 14 | Horse |
| 15 | Horizontal tube |
| 17 | Upper domed cap |
| 19 | Lower domed cap |
| 21 | Support rod |
| 23 | Gusset |
| 25 | Hitch plate |
| 27 | Backup plate |
| 29 | "U" shaped clamp |
| 31 | Bolt |
| 33 | Clamp liner |
| 35 | Drain hole |
| 37 | Weld |
| 39 | Eye bolt |
| 41 | Vertical surface |
| 43 | Support cable |
| 45 | Turnbuckle (commercially available) |
| 47 | Trigger Snap (commercially available) |
| 49 | Cable attachment hole |
| 51 | Hitching hole |

DESCRIPTION—FIGS. 1 TO 8

For a better understanding of the nature and desired objects of this invention reference should be made to the following detailed description taken in connection with the accompanying drawings. Referring to the drawings wherein like reference numerals designate corresponding parts throughout the several figures.

Reference is made first to FIG. 1 of the drawings illustrates an embodiment of an animal tethering system 10 made in accordance with the present invention.

Referring now to FIGS. 1 through 5 the animal tethering system 10 is suited for use with any structure with a vertical surface 41, which is of sufficient strength to support the tethering device and allow room for storing when not in use. One portion of the animal tethering device 10 is comprised of an upper vertical tube 11, a lower vertical tube 13, a gusset 23 which is welded 37 to the vertical tube 11 and to a horizontal tube 15. The lower vertical tube 13 is slightly larger than upper vertical tube 11 allowing upper vertical tube 11 to insert into lower vertical tube 13 and pivot freely. A domed cap 17 is welded 37 to the top end of vertical tube 11. The lower vertical tube 13 has a domed cap 19 welded 37 to the bottom end of the lower vertical tube 13. The horizontal tube 15 is welded 37 to the vertical tube 11 at a point from the top end leaving enough room to accommodate support rod 21 and "U" shaped clamp 29.

A structural support rod 21 is welded 37 between the upper vertical tube 11 and the horizontal tube 15 to add structural support to horizontal tube 15 when downward pressure is applied.

The hitch plate 25 has two holes 49, which allow attachment of a turnbuckle 45 and a trigger snap 47. The turnbuckle 45 and trigger snap 47 attach to support cable 43. Trigger snap 47 attach to the opposite end of the support cable and connect to the eyebolt 39, which are bolted to vertical surface 41. The tether attached to the animal is attached to hitching hole 51 on the hitch plate 25.

Figure 2:
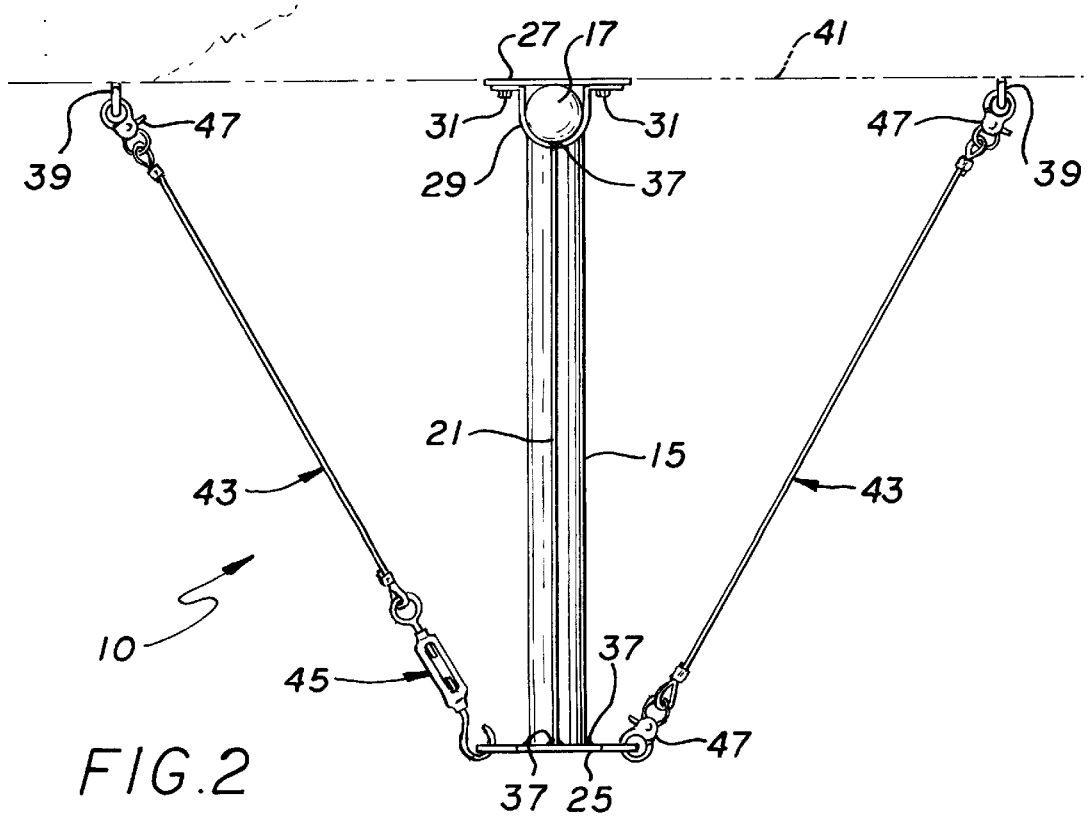
FIG. 2 is a top view of the embodiment of FIG. 1 showing the invention in an extended position.

FIG. 2 is a top view of the animal tethering system 10 showing the "U" shaped clamp 29, the backup plate 27, and bolt 31, which secure the tethering system 10 to the vertical surface 41.

Figure 3:
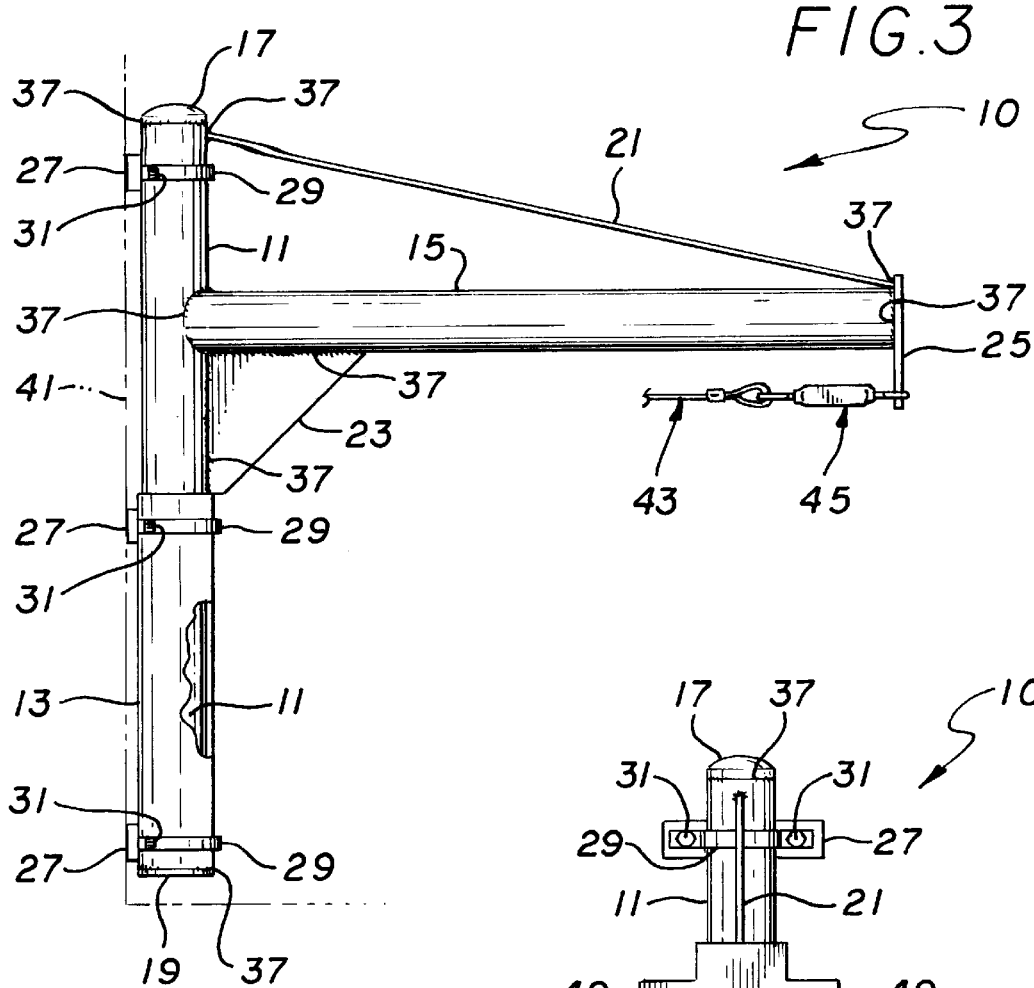
FIG. 3 is a side view of the embodiment of FIG. 1 showing the invention in an extended position.

FIG. 3 is a side view of the animal tethering system 10 showing a cut away section of lower vertical tube 13 to demonstrate that the upper vertical tube 11 is inserted into the lower vertical tube 13.

Figure 4:
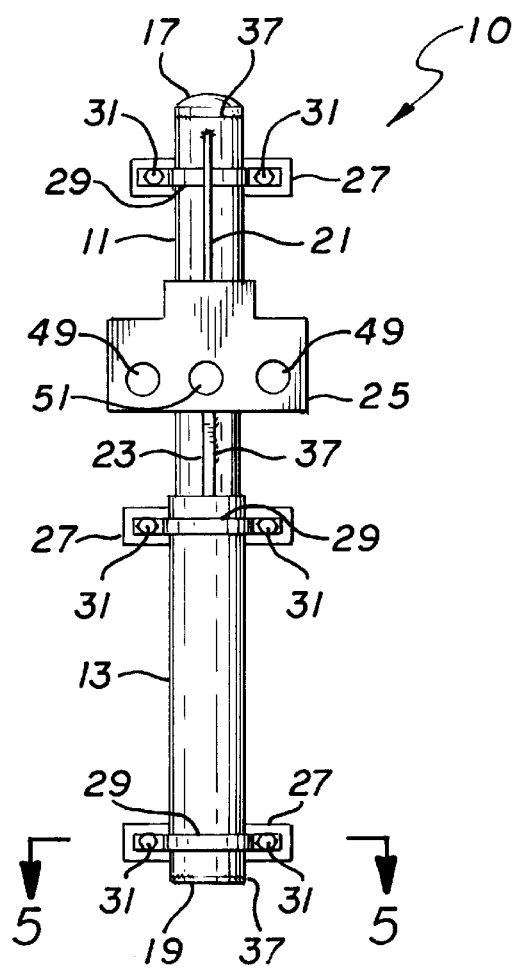
FIG. 4 is a front view of the embodiment of FIG. 1 showing the invention in an extended position.

FIG. 4 is a front view of the animal tethering system 10, as it would appear when in an operational position.

Figure 5:
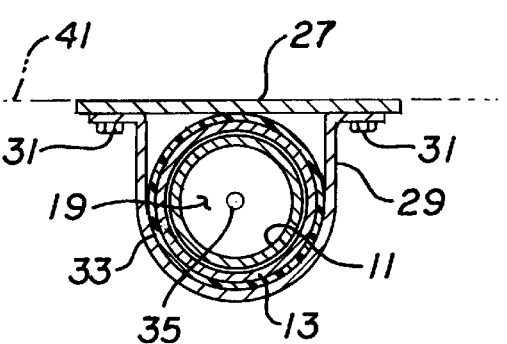
FIG. 5 is a view of the embodiment FIG. 1 taken along lines 5—5 of FIG. 4 showing the inner and outer tube, the clamp liner and the clamp of the pivot system of the invention.

FIG. 5 is a top view of the animal tethering system 10 showing the backup plate 27, the "U" shaped clamp 29, the upper vertical tube 11, the lower vertical tube 13, the clamp liner 33, the lower domed cap 19, and the drain hole 35.

Figure 6:
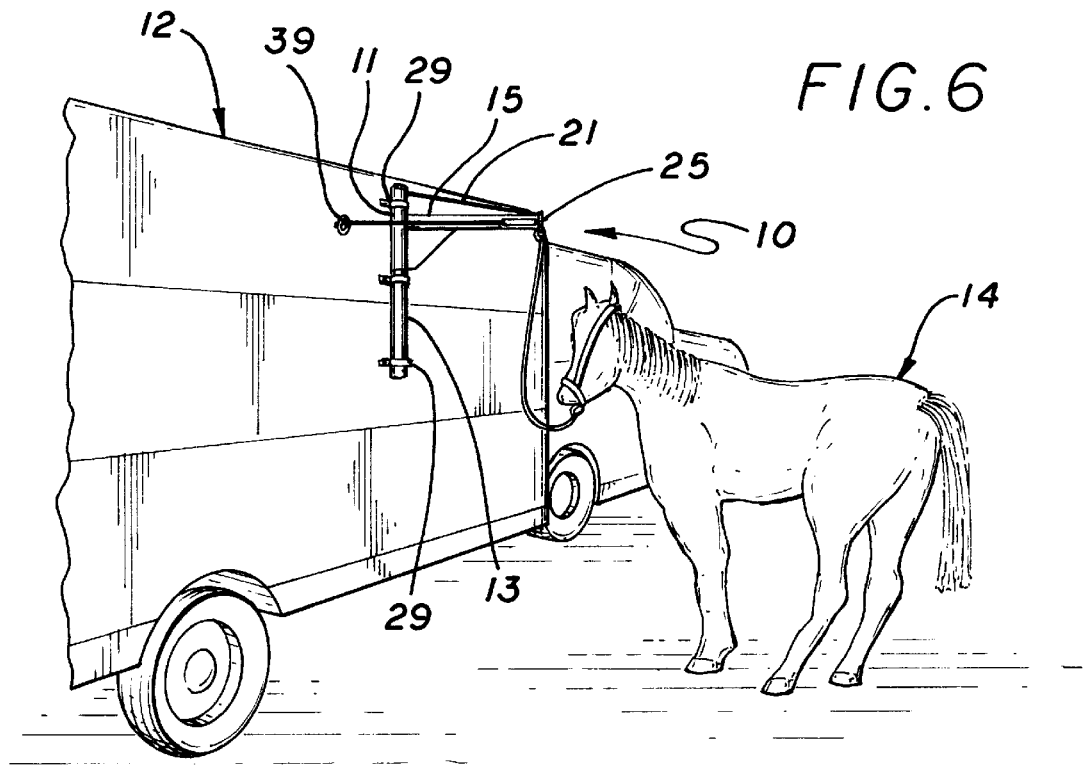
FIG. 6 is a view of the embodiment as it would be mounted to a horse trailer or vertical surface in relation to the animal.
Figure 8:
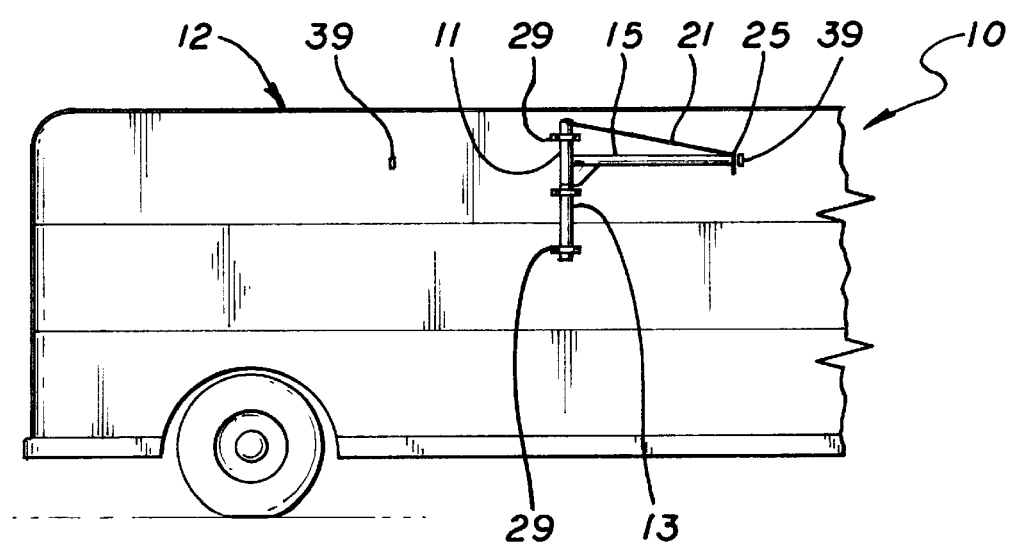
FIG. 8 is a view of the embodiment mounted to a horse trailer or vertical surface in the stored position.

Referring now to FIGS. 6 through 8 in this embodiment of the animal tethering system 10. FIG. 6 is included to show how the embodiment is mounted on a horse trailer 12 at the top extremity as to avoid possible contact with a tethered animal, such as a horse 14. FIG. 7 is a top view of the animal tethering device 10 showing the support cables 43, the eye bolts 39, the trigger snaps 47, the turnbuckle 45, as they are used to stabilize the animal tethering system 10 while an animal is tethered to it. FIG. 8 shows the animal tethering system 10 in a stored position on a horse trailer 12 when not in use.

What is claimed is:

1. An animal tethering system for securing the lead of an animal, comprising:

a frame having an upper vertical tube pivotally connected to a lower vertical tube, and a horizontal tube attached to the upper vertical tube at a right angle; said lower vertical tube substantially covering the upper vertical tube at least one-half the length of the upper vertical tube;

a means to attach said frame to a vertical surface;

a support rod attached to a first end of the upper vertical tube and a free end of the horizontal tube; and a gusset attached to the frame.

2. An animal tethering system as claimed in claim 1 wherein the upper vertical tube has a first end and a second end and is smaller in diameter than the lower vertical tube having a third end and a fourth end; the second end is inserted into the third end thus allowing the upper vertical tube to pivot within the lower vertical tube; the upper vertical tube having a first cap on the first end and the lower vertical tube having a second cap on the fourth end.

3. An animal tethering system as claimed in claim 1 further comprising a plurality of clamps; a first clamp attached to a first back-up plate located proximate the upper vertical tube first end, a second clamp attached to a second back-up plate located proximate the lower vertical tube third end; a third clamp attached to a third back-up plate proximate the lower vertical tube fourth end; the first clamp having a clamp liner secured to the upper vertical tube yet still allow the upper vertical tube to pivot within the lower vertical tube.

4. An animal tethering system as claimed in claim 1 further comprising a hitch plate secured to the horizontal tube at a first free end; the hitch plate having a first hole, a second hole, and a third hole; the second hole located between the first hole and the third hole.

5. An animal tethering system as claimed in claim 1 further comprising a plurality of trigger snaps; a first trigger snap having a first connection and a second connection, the first connection attached to a first support cable at a first tip, the second connection attached to a first hole; a second trigger snap having a third connection and a fourth connection, the third connection attached to the first support cable at a second tip, the fourth connection attached to a first eye bolt; a third trigger snap having a fifth connection and a sixth connection the fifth connection attached to a second support cable at a third tip, and the sixth connection attached to a second eye bolt.

6. The animal tethering system of claim 5 further comprising a turnbuckle having a hook and a link; the hook connected to the third hole and the link connected to the second support cable at a fourth tip to stabilize the position of the horizontal arm.

7. The animal tethering system of claim 1 wherein the support rod is attached to the upper vertical tube proximate the first end and to the horizontal tube proximate the first free end.

* * * * *